Dec. 8, 1959     L. H. WOHLFEIL     2,915,823
ROLLING-TYPE DOUGH CUTTING DEVICE
Filed Jan. 24, 1958
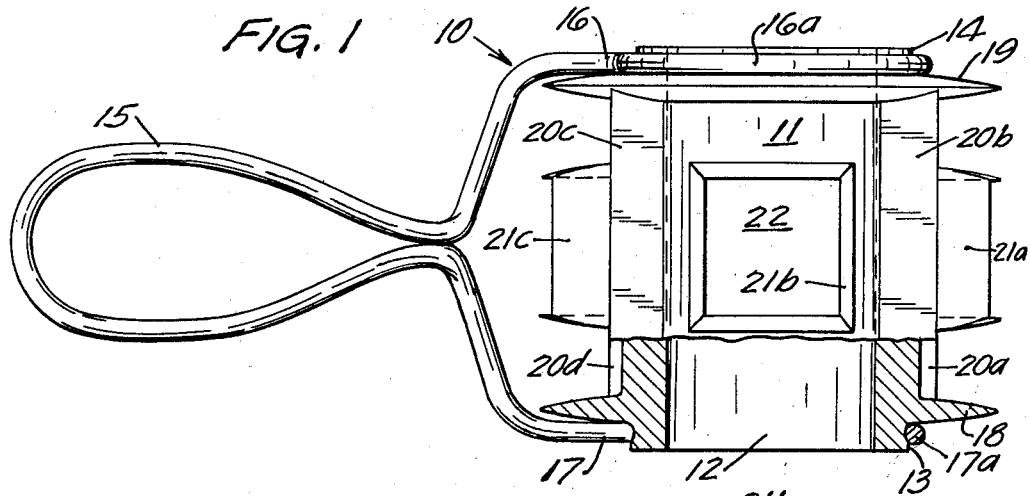
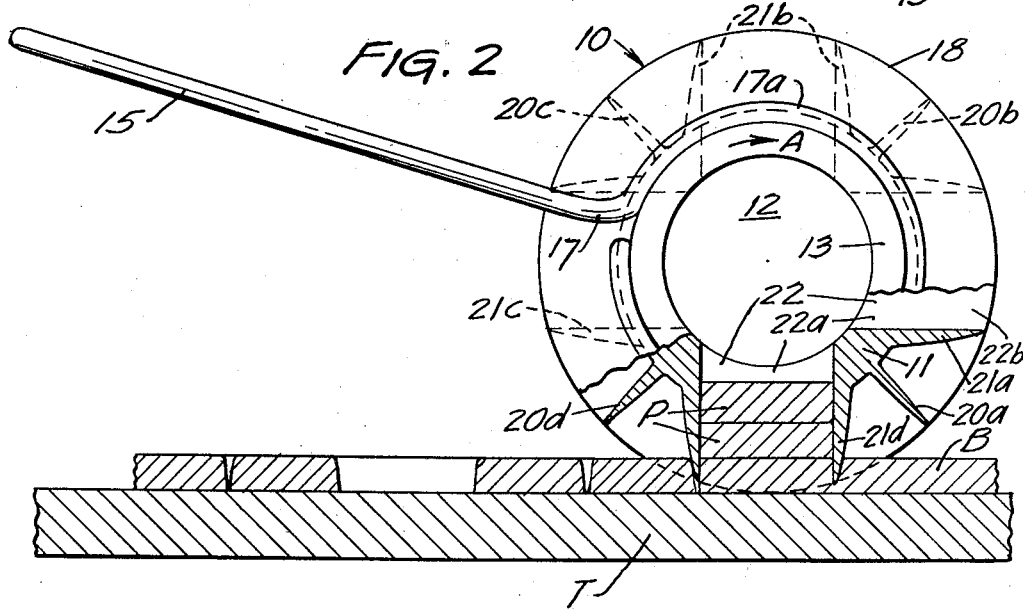
INVENTOR
LEONARD H. WOHLFEIL
BY
Williamson, Schroeder, Adams & Palmatier
ATTORNEYS 2,915,823

ROLLING-TYPE DOUGH CUTTING DEVICE

Leonard H. Wohlfeil, Hazen, N. Dak.

Application January 24, 1958, Serial No. 711,057

3 Claims. (Cl. 30—306)

This invention relates to a device for rolling through dough and cutting the same, and more specifically relates to a device for cutting square doughnuts from a slab of dough.

An object of my invention is to provide a new and improved device of simple and inexpensive construction and operation for rolling through dough and the like for cutting the same into pieces of predetermined configuration.

Another object of my invention is to provide a novel device for rolling through dough and cutting the same with a minimum of wastage of dough in production of doughnuts.

A further object of my invention is the provision of an improved device for rolling through a dough blanket and cutting doughnuts therein and collecting the plugs which are cut from the center of the doughnut.

These and other objects and advantages of my invention will more fully appear from the following description, made in connection with the accompanying drawings, wherein like reference characters refer to the same or similar parts throughout the several views, and in which:

Fig. 1 is a top plane view of the invention with a portion thereof broken away for clarity of detail.

Fig. 2 is a side elevation view of the invention with a portion thereof broken away for clarity of detail.

One form of the present invention is shown in the accompanying drawings and is described herein.

The dough cutting device indicated in general by numeral 10, includes a substantially annular and elongate body member 11 having a cylindrical central opening 12 and having a pair of outwardly facing annular bearing surfaces 13 and 14 formed on the opposite ends thereof. A handle 15, which is constructed of stiff wire or rod has the opposite end portions 16 and 17 formed into loops 16a and 17a respectively which surround the annular bearing surfaces 13 and 14 to permit rotation of the rotary body member 11 with respect to the handle 15.

The cutting device includes a pair of annular cutting knives 18 and 19 formed integrally of the opposite ends of the body member 11 and lying substantially in planes which are oriented normal to the rotation axis of the body member. The annular cutting knives 18 and 19 are of equal diameters.

The device also includes a plurality of elongate and straight cutting knives 20a, 20b, 20c and 20d which, in the form shown, are formed integrally of the body member 11, and which extend between the annular cutting knives 18 and 19 and also project outwardly in radial planes to the outer periphery of the annular knives 18 and 19. The elongate knives 20a–20d are regularly spaced around the outside of the annular body member 11 and are spaced from each other along the circumference of the annular knives 18 and 19 a distance substantially equal to the spacing between the knives 18 and 19 whereby to cut square pieces of dough in cooperation with the annular knives 18 and 19 when the device is rolled through a blanket of dough.

A plurality of outwardly projecting cutting sleeves 21a, 21b, 21c and 21d are also formed integrally with the body member 11 and are disposed between adjacent elongate knives and intermediate the annular knives 18 and 19. The sleeves 21a . . . 21d are radially oriented. A pair of the opposite sides of each sleeve are arranged in parallel relation to the knives 20a . . . 20d, and the other pair of sides of each of the sleeves are parallel to the annular knives 18 and 19, and the outer cutting edges of these latter sides of the sleeves are arcuately curved with a configuration identical to the curvature of the cutting edges of annular knives 18 and 19 so as to cut entirely through the dough. As best seen in Fig. 1, the cutting sleeves are of substantially square configuration for cutting the holes in the doughnuts to be produced. It will be noted in Fig. 2, that the openings 22 in the sleeves communicate with the central opening of the annular body member 11. The inner end portion 22a of each of the openings 22 is of larger size than the outer portion 22b of the opening to allow the plugs P of dough cut from the center of the doughnuts to move upwardly through these sleeves and into the central opening 12 of the body member 11. All of the sides of the opening in each sleeve taper divergently from the outer end of the sleeve to the inner end thereof.

When the doughnuts are to be cut, the blanket B of dough is rolled out onto a work table T and then the device 10 is placed upon the blanket of dough and the cutting knives and sleeves thereof are pressed downwardly through the dough and then the handle is manually moved so as to cause the body member 11 to rotate in the direction of arrow A, whereupon the annular cutting knives 18 and 19 progressively roll and cut through the dough blanket and the elongate knives 20a, etc., and the cutting sleeves 21a, etc., successively engage the dough blanket and project therethrough into engagement with the table T for severing the dough blanket and producing the square doughnuts. The plugs P from the openings in the doughnuts move inwardly through the sleeves into the central opening 12 of the body member whereupon the plugs may be removed through the end of the opening 12. It will be noted that because the cutting knives 18 and 19 are substantially parallel to each other and are normal to the rotation axis, they will sever the dough in two straight lines and then the elongate knives 20a, etc., successively cut the strip between the knives 18 and 19 to form pieces of substantially square configuration. When the sleeves cut the dough, and remove the plugs which are cut, squared rings of dough remain on the table.

It will be seen that the maximum utilization can be made of the dough without having to rework the dough into another blanket because all of the dough is utilized with the exception of the plugs cut from the center which might be baked in that form or reworked into another slab of dough along with other new dough.

It will be seen that I have provided a new and improved cutting device for producing square doughnuts and the like wherein the plugs of dough which are cut from the center of the doughnuts are removed and are allowed to move upwardly through the cutting device to be removed at the end of the cutting device. The cutting knives which cut around the periphery of each doughnut are arranged in such relation with respect to each other as to make maximum utilization of the dough to prevent wastage and to prevent the need for reworking of the dough.

It will, of course, be understood that various changes may be made in the form, details, arrangement and proportions of the parts without departing from the scope

What is claimed is:

1. A dough cutting device, comprising a generally annular and elongate rotary body member and end portions with radially extending annular cutting knives secured thereon and oriented concentric of the rotation axis for rolling through the dough, a plurality of elongate cutting knives on the body member and extending between said annular knives, said elongate knives projecting outwardly in angularly spaced radial planes to the outer peripheral edges of the annular knives and a plurality of outwardly projecting cutting sleeves on the body member and positioned between the elongate knives and intermediate the annular knives, said sleeves being adapted to cut out and retain therein plugs of dough corresponding to the cross section of the sleeves, the open interior of the cutting sleeves communicating with the open interior of the annular body member to allow the plugs of dough to fall into the interior of the body member and out through an end thereof.

2. The invention set forth in claim 1 wherein said annular body member has an outwardly facing annular bearing surface on each end thereof, and a generally radially extending handle having rings surrounding said bearing surfaces, whereby to push the cutting knives and sleeves through the dough.

3. A dough cutting device, comprising a rotary, substantially annular and elongate body member having end portions with radially extending annular cutting knives secured thereon and oriented concentric with the rolling axis for rolling through a slab of dough, a plurality of elongate cutting knives on the body member and extending between said annular knives, said elongate knives projecting outwardly in angularly spaced radial planes to the outer peripheral edges of the annular knives and a plurality of cutting sleeves on the body member and positioned between the elongate knives and intermediate the annular knives, said cutting sleeves projecting outwardly to the periphery of the annular knives to cut holes in the dough and the open interior communicating with the interior of the annular body member, the opening in the cutting sleeve tapering divergently from the outer cutting edge of the sleeve to the opening of the annular body member whereby to retain the plugs of dough removed from the holes therein and to allow the plugs of dough cut by the sleeve to easily fall into the interior of the body member to be discharged through one end thereof.

References Cited in the file of this patent

UNITED STATES PATENTS

| | | |
|---|---|---|
| 2,304,759 | Carroll | Dec. 8, 1942 |
| 2,618,852 | Clough | Nov. 25, 1952 |
| 2,818,645 | Martin | Jan. 7, 1958 |